Nov. 20, 1928.

J. E. DE LONG 1,692,027

COMBINATION BRAKE AND GUARD STRUCTURE

Filed May 19, 1927

Inventor
James E. DeLong
By
Brown, Boettcher + Dieemer,
Attys.

Patented Nov. 20, 1928.

1,692,027

UNITED STATES PATENT OFFICE.

JAMES E. DE LONG, OF WAUKESHA, WISCONSIN, ASSIGNOR TO WAUKESHA MOTOR COMPANY, OF WAUKESHA, WISCONSIN, A CORPORATION OF WISCONSIN.

COMBINATION BRAKE AND GUARD STRUCTURE.

Application filed May 19, 1927. Serial No. 192,511.

This invention relates to a combination brake and guard structure, particularly useful and desirable in connection with the transmission of internal combustion engine industrial units. Where the unit is used in oil field work the brake is a convenient accessory, for example, in hoisting, or in the manipulation of the drills. Where a standard Bessemer clutch is used the brake structure can be readily associated with the clutch and the brake drum can serve as a housing or enclosure around the clutch parts to prevent their falling out in case of breakage, or to keep the operator's clothing from being caught on the ordinarily exposed irregular parts of the clutch.

My improved brake and guard structure can be applied as an attachment without in anywise disturbing the construction, arrangement, or operation of the clutch mechanism.

Figure 1:
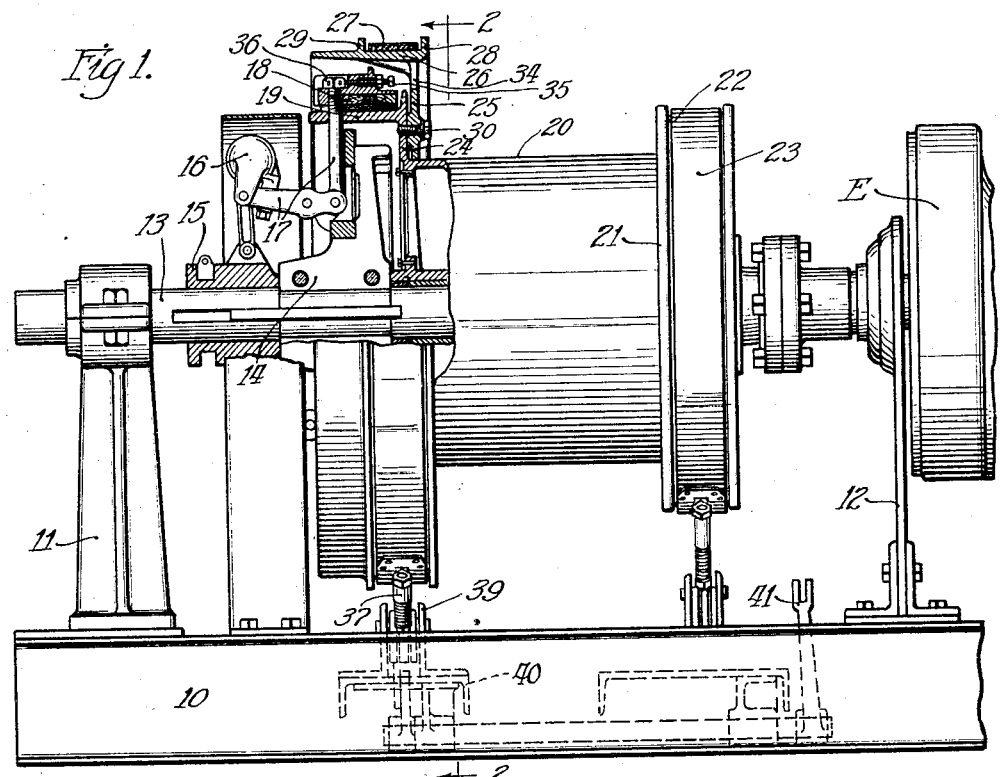
Figure 2:
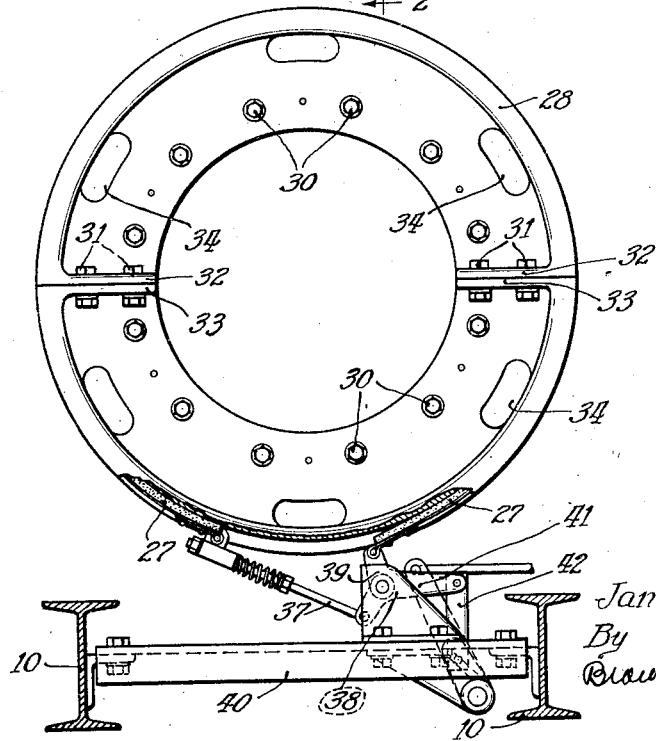

On the drawings:

Figure 1 is a side elevational view of a reversing transmission partly in section and embodying my brake attachment; and Figure 2 is a sectional view on plane 2—2 of Figure 1.

On the drawings, 10 represents the supporting base for the unit, only the end of the engine E being shown. The bearing structures 11 and 12 journal the transmission shaft 13. The shaft 13 carries the clutch frame 14, the clutch structure shown being of the Bessemer type and comprising the clutch sleeve 15, the centrifugal weights 16, the clutch leverage 17, and the clutch band or shoe structure 18 which surrounds the clutch rim or drum 19, this clutch rim forming part of the drum or pulley 20 which is supported on the shaft 13 and normally free to rotate thereon. Engagement of the clutch band or shoe structure with the rim 19 will connect the pulley frame with the shaft 13 to be driven thereby.

Mounted on the shaft 13 alongside of the inner end of the pulley frame or drum 20 is the frame 21 which carries planetary reversing gearing meshing with suitable gearing within the pulley or drum frame 20, such planetary and other gearing being omitted, as its structure and operation is well known. The periphery of the frame 21 forms a brake drum 22 which is engaged by the reverse brake band 23.

The clutch rim 19 is of greater diameter than the hub 20 of the pulley frame or drum and extends from the flange 24 at the outer end of the drum. This flange serves to support a brake structure. This brake structure has the radial flange 25 of an inner diameter to receive the cylindrical pulley drum 20, and which at its outer end supports the rim 26 for the brake band 27, the peripheral extensions or ridges 28 and 29 holding the brake band in position. The cylindrical rim 26 which forms the brake drum is extended so as to overhang and enclose the clutch parts surrounding the clutch drum 19. The brake drum structure thus forms a desirable guard over the clutch parts to prevent their flying out in case of breakage, or to keep the operator's clothing from being caught.

The brake structure supporting flange 25 is secured to the flange 24 on the pulley drum 20 by means of bolts 30, and as shown in Figure 2 the brake structure attachment may be formed in two pieces bolted together by screws 31 engaging through radial flanges 32 and 33 on the halves. The flanges 25 are provided with openings 34 for accessibility to the locking screws 35 which lock in adjusted position the nuts 36 on the clutch lever bolts 17.

This brake structure for the pulley drum 20 makes it easy to maintain a true neutral position between the forward and reverse drives and also makes it very easy to stop the drum or pulley 20 and the work controlled thereby as, for example, where the unit is employed in the operation of a drill, or for hoisting. In operation, the clutch is first released and then the neutral brake 27 applied to bring the drum or pulley 20 to a full stop before engaging the reverse brake for reverse driving. To return to forward driving the reverse brake is released and the neutral brake applied to stop the drum and then the forward clutch engaged before the neutral brake is again released. Such bringing of the driving pulley or load to a stop before change in drive reduces the strain and wear on the clutch and brake structures.

Any suitable means may be provided for operating the brake band. On Figure 2 I have shown such means in connection with the neutral brake band. One end of the band is anchored to the adjusting bolt 37 which is connected to one end of the bell crank lever 38 which is pivoted at its elbow on the bracket 39 supported on the cross beam 40 of the base 10. The other end of the band connects with the other arm of the bell crank lever. An intermediate arm 41 extends from the lever 38 and is controllable from a distance through suitable leverage connections 42, counter-clockwise swing of the lever causing tightening of the brake band around the brake drum.

The brake band and clutch mechanism may be interconnected for automatic operation in proper sequence upon the manipulation of a main controlling lever, but as such mechanism does not form part of my invention it has been omitted. The main feature of my invention resides in the brake drum structure which is attached to the pulley drum and which overhangs and surrounds and encloses the clutch parts to safeguard the operator of the unit.

I claim as follows:—

1. In combination, a shaft, a drum loose on the shaft and provided at one end with a head having an axially extending clutch rim, clutch means including elements movable into and out of operative relation to the outer face of the rim, a housing and brake drum member removably secured to said head and having a rim disposed adjacent and concentric with the clutch rim, the two rims forming a housing enclosing the clutch members and associated parts, and brake means cooperating with the rim of said housing and brake drum member.

2. In combination, a shaft, a drum loose on the shaft and provided at one end with a head having an axially extending clutch rim, clutch means including elements movable into and out of operative relation to the outer face of the rim, and a housing and brake drum member having a rim disposed adjacent and concentric with the clutch rim and a radial flange adjacent the inner end of the drum head, the two rims forming a housing enclosing the clutch members and associated parts, said housing and brake drum member being formed in sections adapted to be placed about and removed from said head by movement radially thereof, said sections being removably secured to the drum head.

3. In combination, a shaft, a drum loose on the shaft and provided at one end with a head having an axially extending clutch rim, clutch means including elements movable into and out of operative relation to the outer face of the rim, a housing and brake drum member having a rim disposed adjacent and concentric with the clutch rim and a radial flange adjacent the inner face of the drum head, the two rims forming a housing enclosing the clutch members and associated parts, said housing and brake drum member being formed in two substantially semi-circular sections having radial flanges at their ends, means detachably securing said flanges together, and means removably securing said sections to the drum head.

In witness whereof, I hereunto subscribe my name this 13th day of May, 1927.

JAMES E. DE LONG.